US006873623B2

(12) United States Patent
Weirich et al.

(10) Patent No.: US 6,873,623 B2
(45) Date of Patent: Mar. 29, 2005

(54) SYSTEM AND METHOD FOR OVERLAYING DSL ACCESS MULTIPLEXER ONTO EXISTING ACCESS SYSTEMS

(75) Inventors: Andreas Weirich, Stittsville (CA); Allan Isfan, Kanata (CA)

(73) Assignee: Ciena Corp., Linthicum, MD (US)

( * ) Notice: Subject to any disclaimer, the term of this patent is extended or adjusted under 35 U.S.C. 154(b) by 830 days.

(21) Appl. No.: 09/872,771

(22) Filed: Jun. 1, 2001

(65) Prior Publication Data

US 2002/0101823 A1 Aug. 1, 2002

(30) Foreign Application Priority Data

Jan. 26, 2001 (CA) .............................................. 2332705

(51) Int. Cl.[7] .............................................. H04L 12/66
(52) U.S. Cl. ...................... 370/463; 370/241; 370/247; 379/1.03; 379/22.01; 379/27.01
(58) Field of Search ................................. 370/241, 247, 370/352, 357, 360, 386, 400, 420, 421, 438, 463, 468, 490, 537, 538, 542, 543, 544; 375/219, 222, 242, 246, 253; 379/1.03, 9.06, 15.03, 22

(56) References Cited

U.S. PATENT DOCUMENTS 5,283,678 A * 2/1994 Czerwiec .................... 398/164
5,920,609 A * 7/1999 Toumani et al. ......... 379/27.01
6,081,517 A 6/2000 Liu et al.
6,130,879 A 10/2000 Liu
6,236,664 B1 5/2001 Erreygers

* cited by examiner

Primary Examiner—Wellington Chin
Assistant Examiner—John Shew
(74) Attorney, Agent, or Firm—Potomac Patent Group PLLC

(57) ABSTRACT

A digital subscriber line access multiplexer overlay onto a digital loop carrier system for transporting high speed digital data over an existing backplane which carries voice, data, and test signals between voice line cards and a carrier line. The voice signals are time division multiplexed into frames. The system includes a data bus interface for impressing the high speed data on a subset of existing backplane buses for transport along the backplane and for retrieving high speed digital data from the backplane buses. The system further includes a plurality of data line cards for connecting to the backplane and backplane subset conductors, the data line cards being adapted to couple the high speed data between the subscriber line and the backplane, whereby the high speed digital data can be routed over the backplane subset to any of the digital data line cards without interfering with the voice signals routed to voice line cards.

21 Claims, 4 Drawing Sheets

SYSTEM AND METHOD FOR OVERLAYING DSL ACCESS MULTIPLEXER ONTO EXISTING ACCESS SYSTEMS

The present invention relates generally to the field of Digital Subscriber Lines (DSLs), and particularly to a system and method for implementing DSL technology at remote access terminals.

BACKGROUND OF THE INVENTION

In order to relieve the shortage of copper subscriber lines from a telephone central office to a telephone subscriber residence, and also to reduce the length of such lines, access concentrators are frequently employed. Access concentrators employing a digital multiplex carrier to carry many individual voice conversations on a single, or several, multiplex carriers are known as Digital Loop Carriers (DLCs).

FIG. 1 illustrates a block diagram of typical DLC represented generally by the numeral 10. A number of individual twisted pair subscriber lines 12 are terminated by line cards 14. In the case of typical residential telephone service, the lines 12 are terminated by plain-old telephone service (POTS) line cards 14, which provides a number of functions required to operate a telephone or other terminal 16 connected to the line 12 at the subscriber's residence. These functions usually include, but are not limited to:

Battery—supplying power to the subscriber terminal;

Overvoltage—protecting the line card against environmentally caused overvoltages;

Ringing—supplying a ringing signal;

Supervision—detecting when a subscriber lifts the telephone receiver;

Coding—converting the analog line signal into digital representation;

Hybrid—separating the received from the transmitted signals; and

Termination—terminating the line with a required standard electrical impedance.

These functions are often collectively referred to as BORSCHT.

Each line card produces a signal in a format suitable for being multiplexed with other line card signals onto a common Time Division Multiplexed (TDM) bus 18 although other buses may be employed. Typically, each line signal is sampled at an 8 kHz rate and each sample is converted into a digital codeword, each usually consisting of 8 bits using one of several standard coding formats known as $\mu$-law Pulse Coded Modulation (PCM) or A-law PCM. The resulting bit rate per terminated line is, therefore, 64 kb/s.

The codewords from one terminated line 12 or line card 14 are interleaved with those of other lines 12 and line cards 14 onto the TDM bus 18. The codewords are then commonly transmitted over a backplane to a common element, herein called a Transmit and Receive Unit/Line Interface Unit (TRU/LIU) 20 by assigning one or several timeslots to each line card. The TRU/LIU 20 performs two main functions:

1. Electrically driving and receiving signals to/from the TDM bus 18, clock generation, timeslot control, and the like; and 2. Interfacing to a digital multiplex carrier 21, by means of a Digital Carrier Interface (DCI) 27, which possibly includes but is not limited to line coding, line quality monitoring, clock recovery, synchronization, loopbacks, framing, alarm detection, multiplexing of signaling bits, maintenance channel termination, and maintenance and remote monitoring functions. Common digital multiplex line interfaces include electrical (T1, E1) and optical (OC-3, OC-12) interfaces.

In order to allow for the electrical testing of subscriber lines 12 and line cards 14, a Test Access Unit (TAU) 30 is typically provided. The TAU 30 is connected to all line cards 14 in the DLC 10 by means of a test bus 32. Test bus implementations and characteristics vary widely depending on the particular embodiment and design of the DLC 10. Typically, in a DLC 10 designed and intended primarily for multiplexing voice services, the test bus 32 characteristics are intended to be electrically suitable for voice signals, but not necessarily for high speed digital signals, such as digital logic or DSL signals.

The TAU 30 is typically controlled by a control unit 40, which may communicate with the TAU 30 and other units in the DLC 10 by means of a control bus 41.

FIG. 2 illustrates the TAU 30 and line card 14 in greater detail. Here a plurality of line cards 14 and the TAU 30 are interconnected for line and circuit testing purposes by the test bus 32.

The test bus 32 typically groups a number of independent conductors together into one or more logical buses. Without loss of generality, the test bus 32 in FIG. 2 has been shown to be logically grouped into four subsets herein labeled, with no intended loss of generality, TestOut2, TestIn2, TestOut4, and TestIn4. This illustrates two relevant concepts:

1. Some line cards communicate with a subscriber terminal using four or more wires and may consequently require 4-wire test buses; and 2. The capability to simultaneously test the subscriber line (known as the test out function) and the Line Interface Circuit (LIC) 11 of the line card 14 (known as the test in function) may be provided by means of distinct subsets of the test bus 32.

FIG. 2 also shows the constituent functional blocks of a 2-wire line card 14. The TDM and Control Interface (TCI) 13 contains circuitry to electrically interface to the TDM bus 18 and the control bus 41, as well as provide general control functions for the line card 14. The LIC 11 provides the BORSCHT functions described above. The test relay 15 provides a means for electrically isolating the LIC 11 from the subscriber line 12, connecting the LIC 11 to the TestIn2 bus, and connecting the subscriber line 12 to the TestOut2 bus.

Operation of 4-wire line cards (not shown) is a logical extension of the above with respect to test relay connectivity with corresponding 4-wire test buses.

FIG. 2 also shows constituent functional blocks of the test access unit 30. A terminations block 34 contains a plurality of electrical terminations required in order to enable meaningful electrical tests of the LIC 11 or the subscriber line 12 to be performed via the test bus 32. A switch matrix 33 provides appropriate means (typically relays or other electrically controllable switches) to electrically connect one or more subsets of the test bus 32 to one or more of a set of line terminations in the terminations block 34 and/or to the external test line 31 (typically twisted pair), either individually, jointly, or severally. A Control Interface 132 contains circuitry to electrically interface with the control bus 41, provide general control functions, and provide specific control functions to actuate the appropriate relays (or other interconnection devices) in the switch matrix 33. The control interface 132 may also function to relay communications to and from the control unit 40 (see FIG. 1) by means of the control bus 41 to and from an external device connected by means of a control interface port 35. An example of such an external device might be a keyboard and display enabling a craftsperson to control the testing of lines of line cards by means of keyboard commands.

Both the test relay 15 and the switch matrix 33 are responsive to the control unit 40, which in turn may be responsive to commands from a test controller (not shown).

In many instances, it is desirable to upgrade an existing DLC 10 to enable the provision of new services, specifically for Digital Subscriber Line (DSL) services, and especially asymmetric DSL (ADSL). Besides ADSL, there are a variety of DSL services (e.g., symmetric DSL, high rate DSL, very high rate DSL, etc.) that are generally referred to collectively as xDSL. Since the bit rate per subscriber line for such a service is many times that for which a voice DLC was engineered and requires the processing of data protocols, such an upgrade becomes problematic.

In order to provide DSL service to a subscriber already served by a voice-only DLC 10 requires changes to hardware. This change may necessitate the physical reconnection of a subscriber's line to a completely different DSL-capable DLC, if one is available at the site. If a DSL-capable DLC is not available, one may need to be installed to serve that subscriber, if space is available in the remote cabinet. If there is insufficient unused space in the cabinet or there is another reason why a new DLC cannot be installed, the subscriber may be denied DSL service altogether.

It is an object of the present invention to obviate or mitigate some of the above disadvantages.

BRIEF SUMMARY OF THE INVENTION

In accordance with one embodiment of the present invention, there is provided an overlay system for routing high speed data in a digital loop carrier system. The overlay system impresses and retrieves high speed data on a subset of existing backplane buses without interference among voice, high speed data and test signals.

In accordance with another embodiment of the present invention, there is provided a data bus interface for impressing the high speed data on a subset of existing backplane buses for transport along the backplane and for retrieving high speed digital data from the backplane buses, wherein the existing backplane carries voice, data, and test signals between voice line cards and a carrier line. In one aspect the voice signals are time division multiplexed (TDM) into frames.

In accordance with yet another embodiment of the present invention, there is provided a plurality of data line cards for connecting to the backplane and backplane subset conductors, the data line cards being adapted to couple the high speed data between the subscriber line and the backplane, wherein the high speed digital data can be routed over the backplane subset to any of the digital data line cards without interfering with the voice signals routed to voice line cards.

These embodiments are further detailed with reference to the following figures and detailed description.

DETAILED DESCRIPTION OF THE INVENTION

Figure 1:
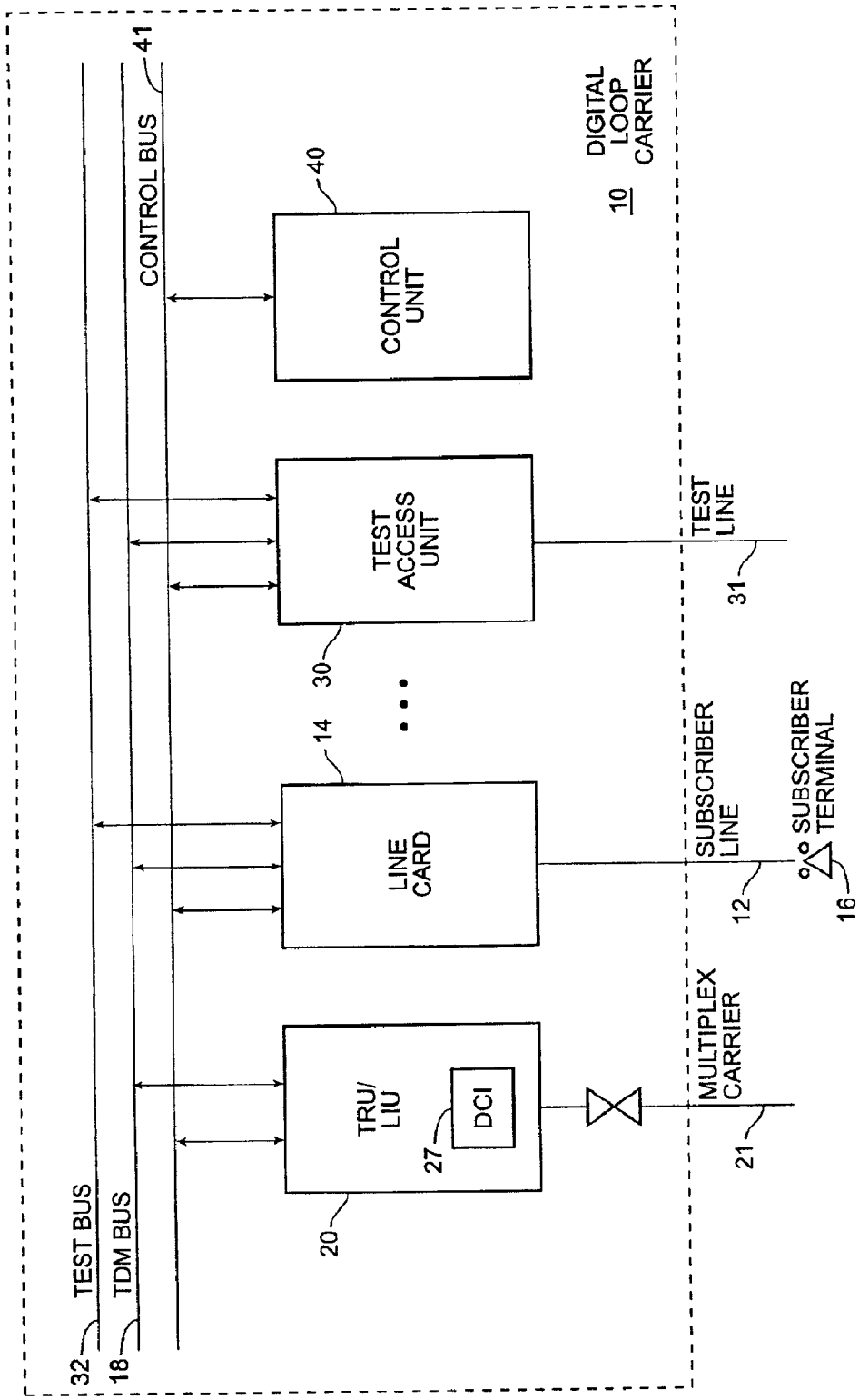
FIG. 1 is a block diagram of a typical digital loop carrier according to the prior art.
Figure 2:
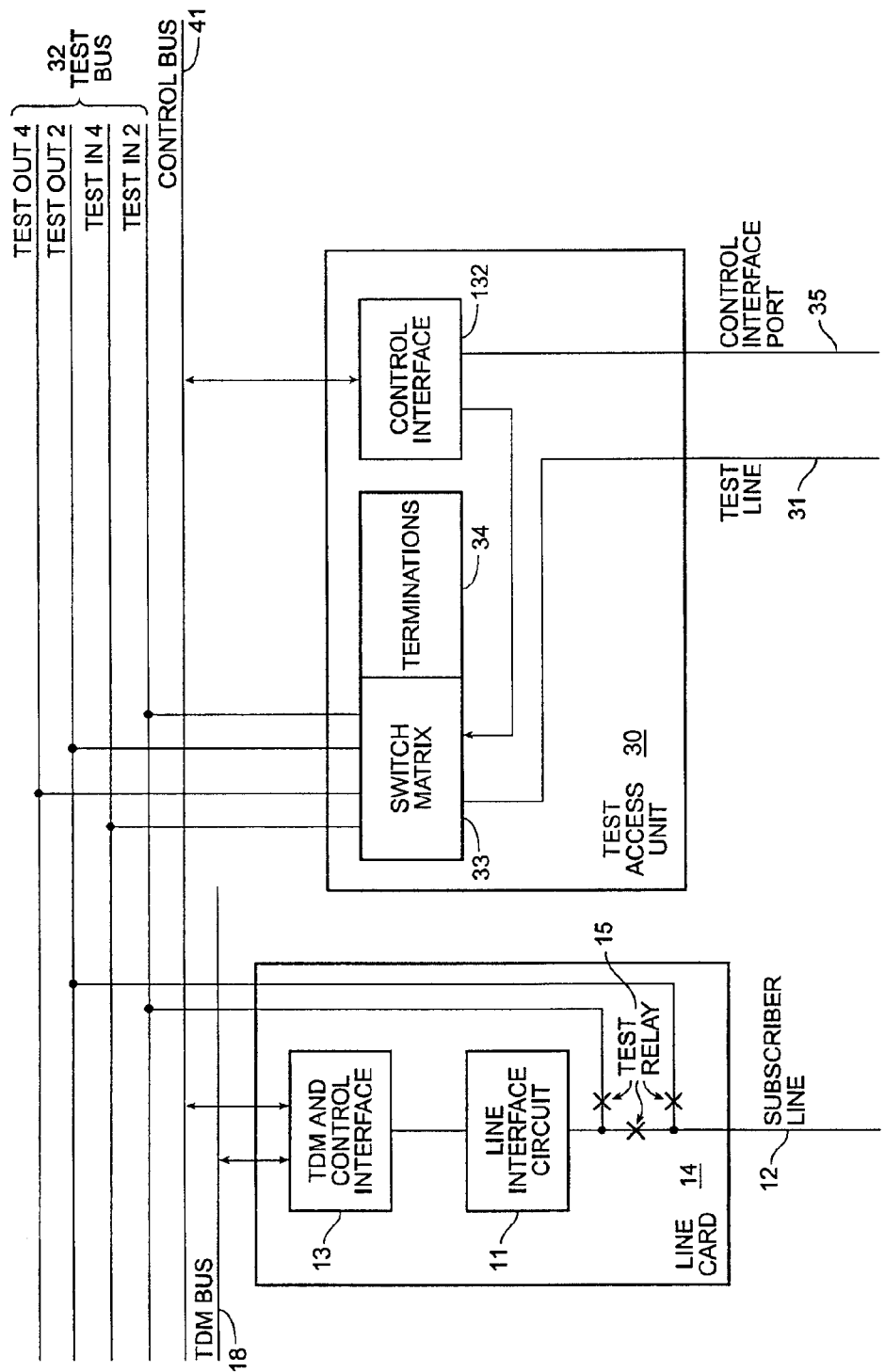
FIG. 2 is a schematic diagram of a test access unit and line card of FIG. 1.

For convenience, like structures in the drawings are referred to using like numerals.

Figure 3:
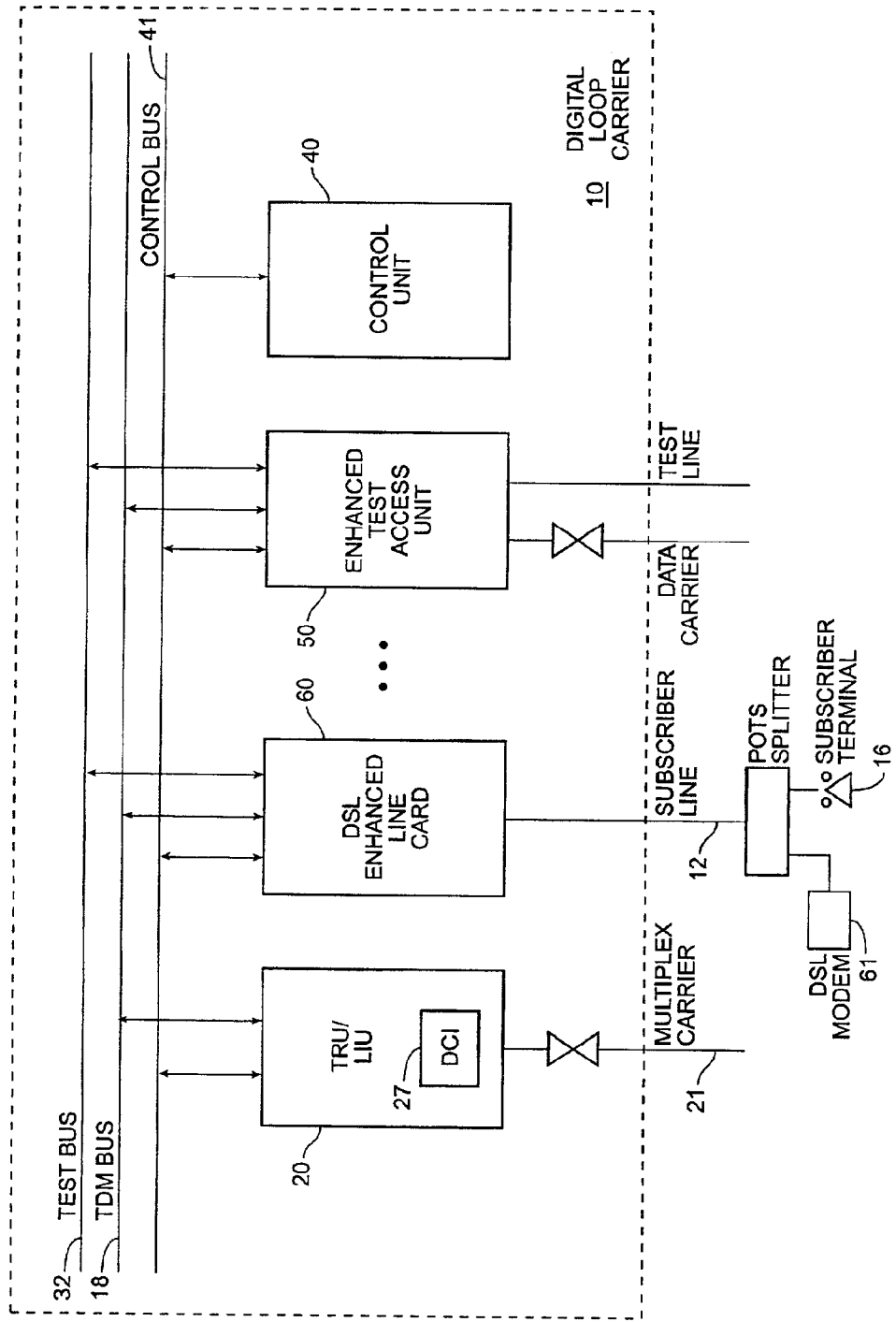
FIG. 3 is a block diagram of a digital loop carrier with overlaid DSL access multiplexer according to an embodiment of the present invention.

FIG. 3 shows the architecture of the DSL access multiplexer (DSLAM) overlay on an existing DLC 10. An enhanced test access unit 50 and DSL enhanced line card 60 provide DSL service to DSL modems 61 while maintaining POTS service to existing voiceband subscriber lines 12 and subscriber terminals 16.

Important components of the operation of the DSLAM overlay, and noteworthy aspects of the present invention, include:

1. The reuse of a subset of the test bus 32, hereinafter called and shown in FIG. 4 as the data bus 70, for the transport of data streams to and from the DSL enhanced line cards 60, in lieu of its previous function of the carriage of test signals; and
2. The combining of functionality of the test access unit 30 with a data aggregation and multiplexing function.

Figure 4:
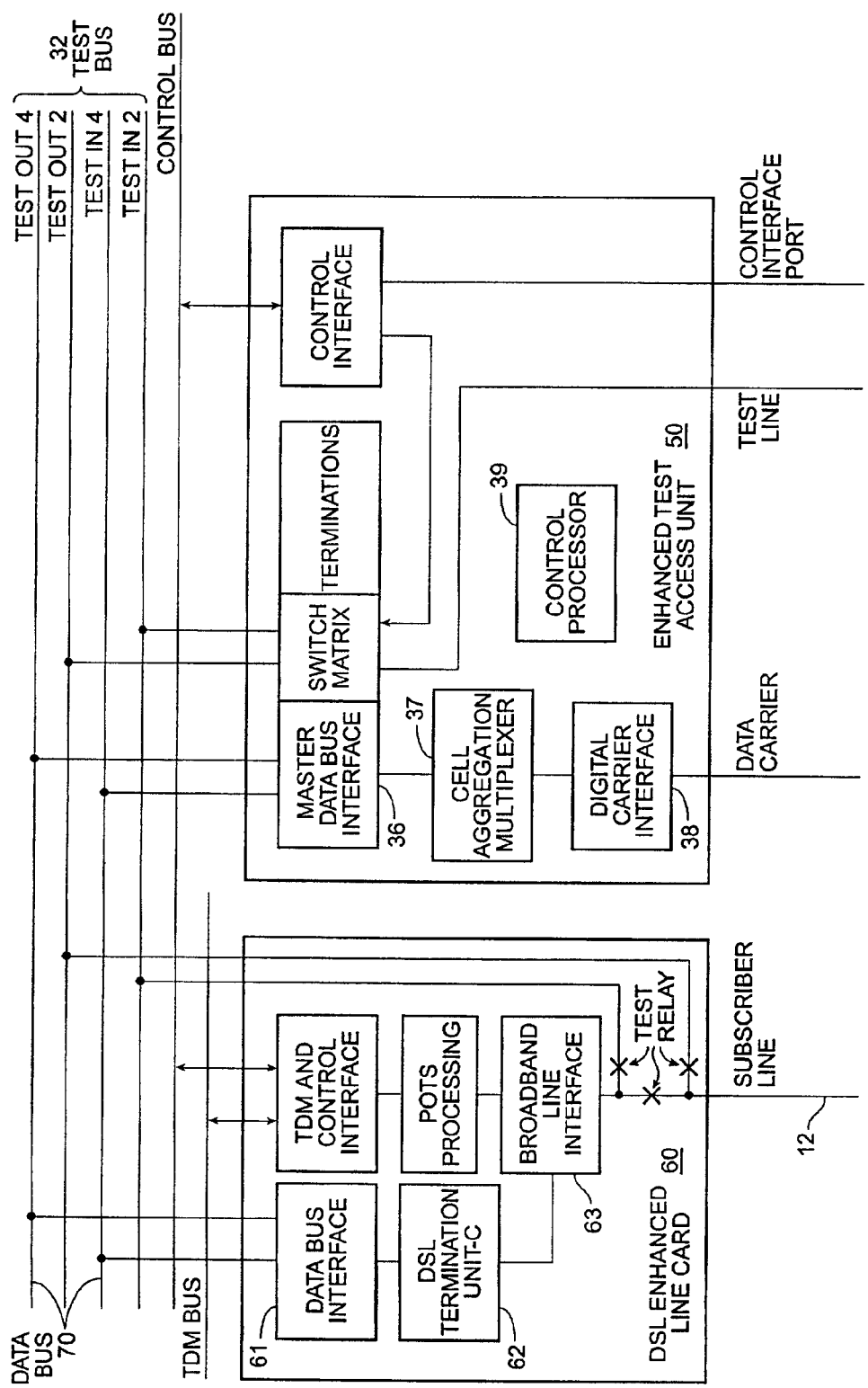
FIG. 4 is a schematic diagram showing another interconnection of an enhanced test access unit and an enhanced line card with a subset of the test bus.

Without intending a loss of generality, FIG. 4 illustrates the use of the test bus 32 subsets TestOut4 and TestIn4 as the data bus 70 for the transport of the data bit streams. The previous functions of the TestOut4 and TestIn4 buses are, in general, no longer available when used as a data bus, and may consequently result in the loss of some line and line card testing capabilities. For example, and with no loss of generality intended, the use of the TestOut4 and TestIn4 buses might result in the loss of testing capability for 4-wire interfaces, but not of testing capability for 2-wire interfaces. The provision of adequate data bit rates for the aggregation and multiplexing of data streams from a plurality of DSL enhanced line cards 60 requires the data bus to carry signals of a significantly higher bandwidth than the voiceband test signals previously carried. There exist a wide variety of DLC system implementations for which the above described overlayment is possible, including (but not limited to) SLC Series 5 Carrier System (a trademark of Lucent Technologies Inc.), SLC-2000 Access System (a trademark of Lucent Technologies Inc.), and SLC Series 96 Carrier System (a trademark of Lucent Technologies Inc.). Details of implementation, such as the number of test buses conductors, their arrangement, the assignment of these conductors to various testing and test access functions, and their electrical characteristics may differ from system type to system type.

FIG. 4 illustrates the enhanced test access unit 50, the enhanced line card 60, and their interconnection by means of a subset of the test bus 32 in greater detail. The enhanced test access unit 50 expands the functionality of the previously-described TAU 30 by adding the following functions: a Master Data Bus Interface (MDBI) 36; a Cell Aggregation Multiplexer (CAM) 37; a Digital Carrier Interface (DCI) 38; and a control processor 39. Details of the CAM 37, DCI 38, and control processor 39 are well known in the art and need not be discussed here in detail. The MDBI 36 is the master element in the transmission, reception, and protocol implementation for the data bus 70. The MDBI 36 contains all the functions required to communicate over the data bus 70 with the data bus interface (DBI) 61 in the DSL enhanced line card 60. It provides clocking, framing, cell address translation, data recovery, cell queuing, and other functions required for the appropriate operation of the data bus 70. The MDBI 36 and DBI 61 together embody and implement the data bus access protocols and design considerations previously described. The MDBI 36 also provides a suitable interface to effect data or cell transfer to the CAM 37.

The CAM 37 receives and transmits data to and from the MDBI 36. This data may exist in the format of Asynchronous Transfer Mode (ATM) cells, Ethernet packets, or other data packets or formats which are contained in the combined data streams from a plurality of DSL enhanced line cards 60. Without limiting the generality of the discussion, the descriptions that follow will refer to ATM cell handling only. The CAM 37 buffers cells in queues, alters cell headers, controls the sequence of the outflow of cells as required to provide ATM multiplexing, cell flow control, quality of service management, policing, shaping, etc. suitable for ATM access multiplexer functionality as is well known in the art. The CAM 37 then forwards the cells/packets on to a data network through the DCI 38.

The DSL enhanced line card 60 expands the functionality of the previously described line card 14 by adding the following functions: a Data Bus Interface (DBI) 61, a DSL Termination Unit-Central (DTU-C) 62, and a broadband line interface 63. Certain types of DSL signals, such as Asymmetric DSL (ADSL) conforming to ITU-G.922 standards, may coexist on a single line with POTS analog signals. It is, therefore, desirable to provide a line card capable of simultaneously communicating DSL and POTS signals between the subscriber line 12 and the DLC 10 backplane buses.

The DBI 61 consists of all functions required to communicate over the data bus 70 with the MDBI 36 of the enhanced test access unit 50. These may include, but are not limited to, data bus protocol implementation, clock recovery and synchronization circuitry, electrical drivers, receivers, and timing circuits. The DBI 61 implements the necessary circuitry to conform to the data bus protocol requirements of fair access of multiple line cards to a single shared bus, ATM cell queuing and buffering with multiple qualities of service, and other functions. The DBI 61 is used for impressing a digital signal at a high rate onto the existing conductors of the backplane data bus 70, and for providing elastic stores to match the burst transmission characteristics of the data bus 70 to the continuous bit stream transmitted and received from the DTU-C 62.

The DTU-C 62 (also referred to as a data pump) consists of all circuitry normally required to convert a bit stream to/from signals which can be transmitted on a twisted pair subscriber line according to standard or proprietary protocols and modulation algorithms including (but not limited to) CAP, G.lite, and ANSI T1.413. Such devices are well known in the art and do not need to be described in detail.

The broadband line interface 63 performs all the functions of the line interface circuit 11 for both POTS signals as well as for the DSL signals transmitted and received by the DTU-C 62. The broadband line interface 63 may include a separate POTS line interface, DSL line interface, and POTS splitter, or may implemented as unified circuitry not requiring a POTS splitter. Such devices are well known in the art and do not need to be described in detail.

Although the invention has been described with reference to certain specific embodiments, various modifications and equivalents thereof will be apparent to those skilled in the art without departing from the spirit and scope of the invention as outlined in the claims appended hereto.

What is claimed is:

1. A test access unit for coupling high speed data in a digital loop carrier system having a plurality of voice line cards, a plurality of digital line cards, and a backplane including a time division multiplexed bus for routing voice data and a test bus, said test access unit comprising:

a data bus interface circuit coupled to route said high speed data to and from said plurality of digital line cards over a subset of said test bus, whereby said high speed data is routed over said backplane to or from said plurality of digital line cards without interfering with said voice data routed over said backplane;

an aggregation multiplexer circuit coupled to aggregate and multiplex said high speed data from, and to demultiplex and deaggregate said high speed data to, said plurality of digital line cards via said data bus interface circuit; and a digital carrier interface circuit coupled to interface said high speed data between said aggregation multiplexer circuit and a high speed digital network.

2. The test access unit of claim 1, wherein said subset of said test bus comprises a 4-wire test bus.

3. The test access unit of claim 1, further comprising:

a plurality of electrical terminations coupled to test at least one of said digital loop carrier system and a component associated therewith.

4. The test access unit of claim 3, wherein said plurality of electrical terminations are coupled via another subset of said test bus to test at least one of said digital loop carrier system and said component associated therewith.

5. The test access unit of claim 4, wherein said another subset of said test bus comprises a 2-wire test bus.

6. A data line card for coupling high speed data in a digital loop carrier system having a backplane including a time division multiplexed bus for routing voice data and a test bus, said data line card comprising:

a data bus interface circuit coupled to route said high speed data over a subset of said test bus, whereby said high speed data is routed over said backplane without interfering with said voice data routed over said backplane;

a digital subscriber line termination unit coupled to convert between said high speed data and twisted pair data; and a broadband line interface circuit coupled to convert between said twisted pair data and information received from a subscriber line.

7. The data line card of claim 6, wherein said subset of said test bus comprises a 4-wire test bus.

8. The data line card of claim 6, further comprising:

a test relay configured to isolate said broadband line interface circuit from said subscriber line and to couple said broadband line interface circuit and said subscriber line to another subset of said test bus.

9. The data line card of claim 8, wherein said another subset of said test bus comprises a 2-wire test bus.

10. The data line card of claim 6, further comprising:

a voice interface circuit coupled to interface said voice data between said time division multiplexed bus and said broadband line interface circuit.

11. An overlay system for routing high speed data in a digital loop carrier system, said digital loop carrier system having a backplane including a time division multiplexed bus for routing voice data and a test bus, said overlay system comprising:

a plurality of data line cards, each coupled to a subscriber line, and each coupled to route said high speed data between said subscriber line and a subset of said test bus, whereby said high speed data is routed over said backplane without interfering with said voice data routed over said backplane; and a test access unit coupled to route said high speed data to and from said plurality of digital line cards over said subset of said test bus, and to interface said high speed data with a high speed digital network.

12. The overlay system of claim 11, wherein each of said plurality of data line cards comprises:

a data bus interface circuit coupled to route said high speed data over said subset of said test bus;

a digital subscriber line termination unit coupled to convert between said high speed data and twisted pair data; and a broadband line interface circuit coupled to convert between said twisted pair data and information received from said subscriber line.

13. The overlay system of claim 11, wherein each of said plurality of data line cards further comprises:

a test relay configured to isolate said broadband line interface circuit from said subscriber line and to couple said broadband line interface circuit and said subscriber line to another subset of said test bus.

14. The overlay system of claim 13, wherein said another subset of said test bus comprises a 2-wire test bus.

15. The overlay system of claim 11, wherein said subset of said test bus comprises a 4-wire test bus.

16. The overlay system of claim 11, further comprising:

a voice interface circuit coupled to interface said voice data between said time division multiplexed bus and said broadband line interface circuit.

17. The overlay system of claim 11, wherein said test access unit comprises:

a data bus interface circuit coupled to route said high speed data to and from said plurality of digital line cards over said subset of said test bus;

an aggregation multiplexer circuit coupled to aggregate and multiplex said high speed data from, and to demultiplex and deaggregate said high speed data to, said plurality of digital line cards via said data bus interface circuit; and a digital carrier interface circuit coupled to interface said high speed data between said aggregation multiplexer circuit and said high speed digital network.

18. The overlay system of claim 17, wherein said test access unit further comprises:

a plurality of electrical terminations coupled to test at least one of said digital loop carrier system and a component associated therewith.

19. The overlay system of claim 18, wherein said plurality of electrical terminations are coupled via another subset of said test bus to test at least one of said digital loop carrier system and said component associated therewith.

20. A method of routing high speed data in a digital loop carrier system, said digital loop carrier system having a backplane including a time division multiplexed bus for routing voice data and a test bus, said method comprising the acts of:

receiving said voice data and said high speed digital data from a subscriber line;

routing said voice data over said time division multiplexed bus and said high speed digital data over a subset of said test bus, whereby said high speed data is routed over said backplane without interfering with said voice data routed over said backplane;

interfacing said high speed data with a high speed digital network; and sending said voice data and said high speed digital data to said subscriber line.

21. The method of claim 20, further comprising:

testing at least one of said digital loop carrier system and a component associated therewith via another subset of said test bus.

* * * * *